H. LANDSIEDEL.
ADDING AND RECORDING MACHINE.
APPLICATION FILED JULY 12, 1909.
1,249,279.
Patented Dec. 4, 1917.
6 SHEETS—SHEET 1.
Fig. 1.
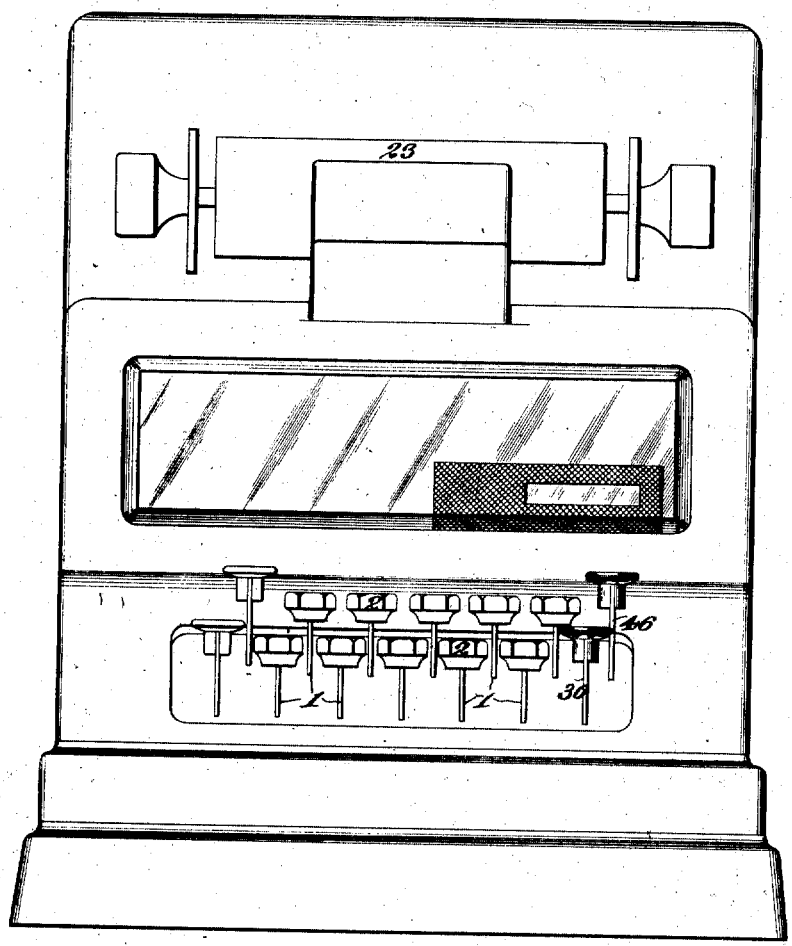
Fig. 2.
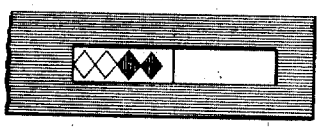
Fig. 3.
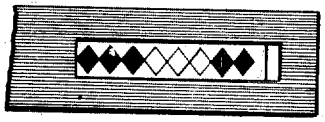
Attest.
Fig. 4.
23 16
Fig. 5.
68403I 29
Inventor;
Harry Landsiedel
By J. D. Rippey
attys

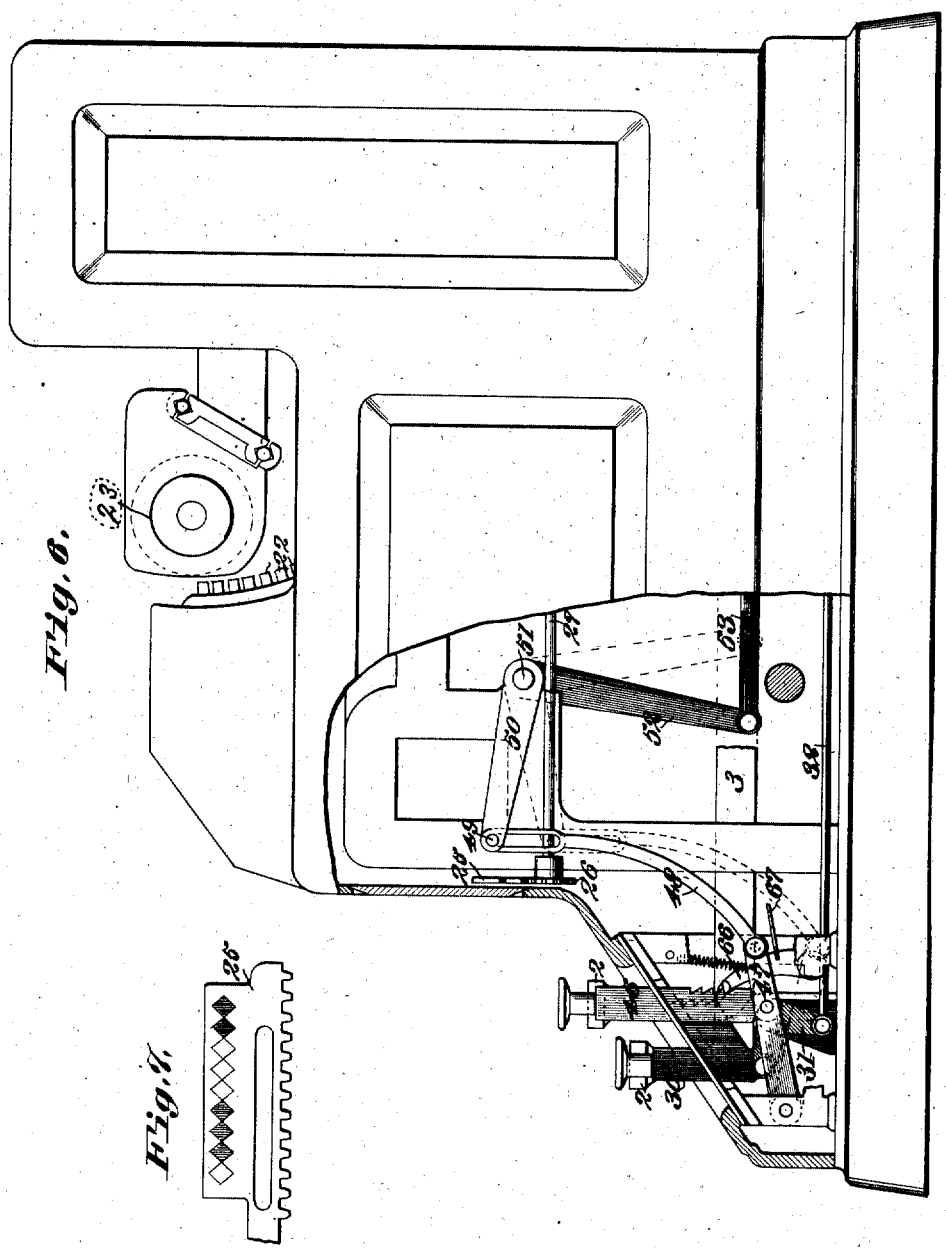

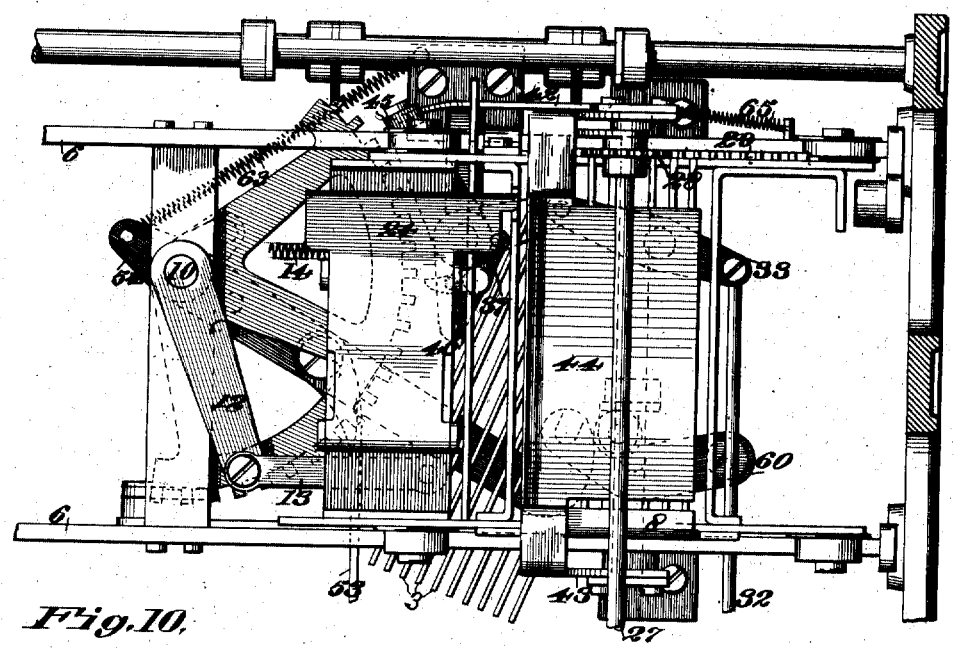
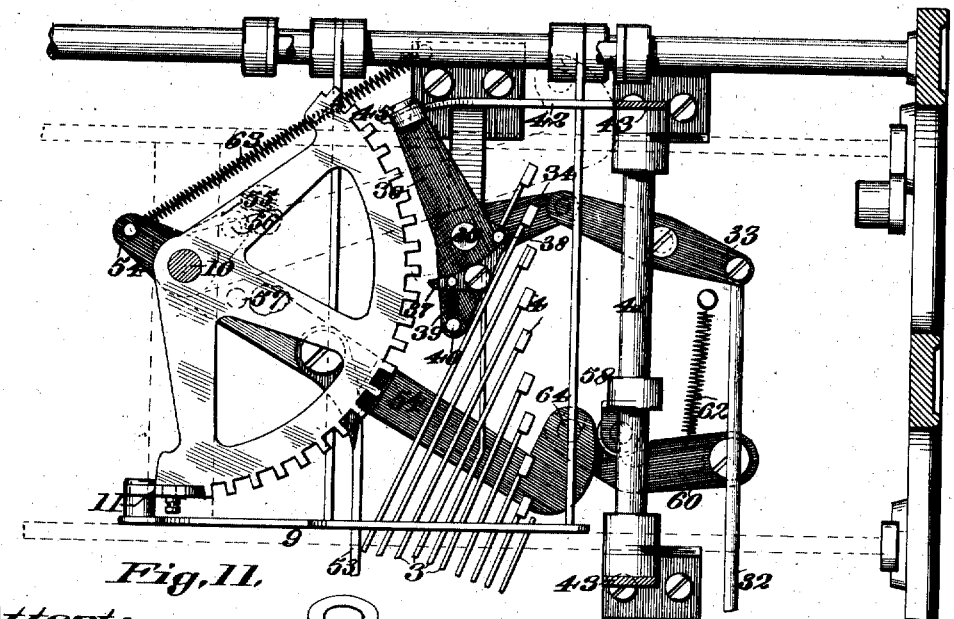

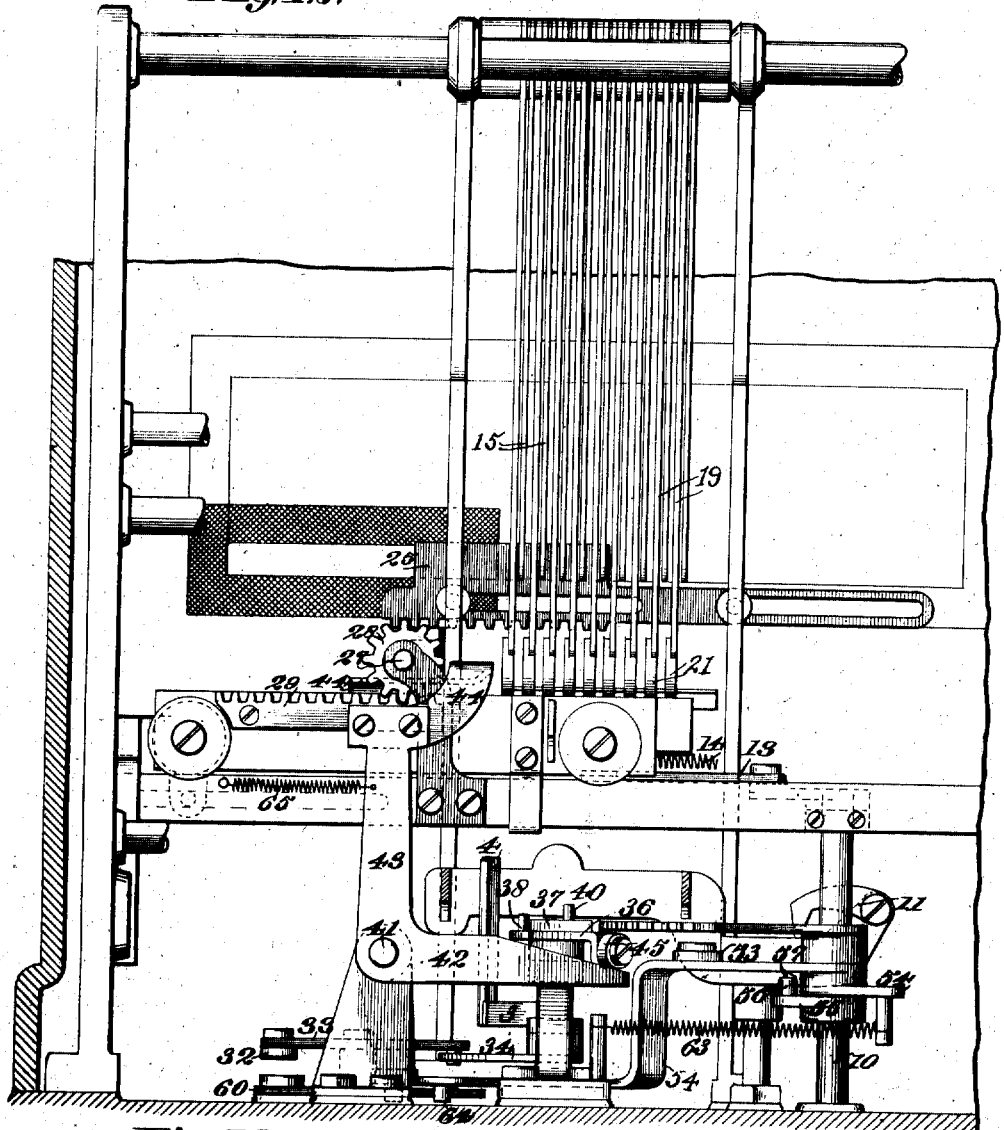

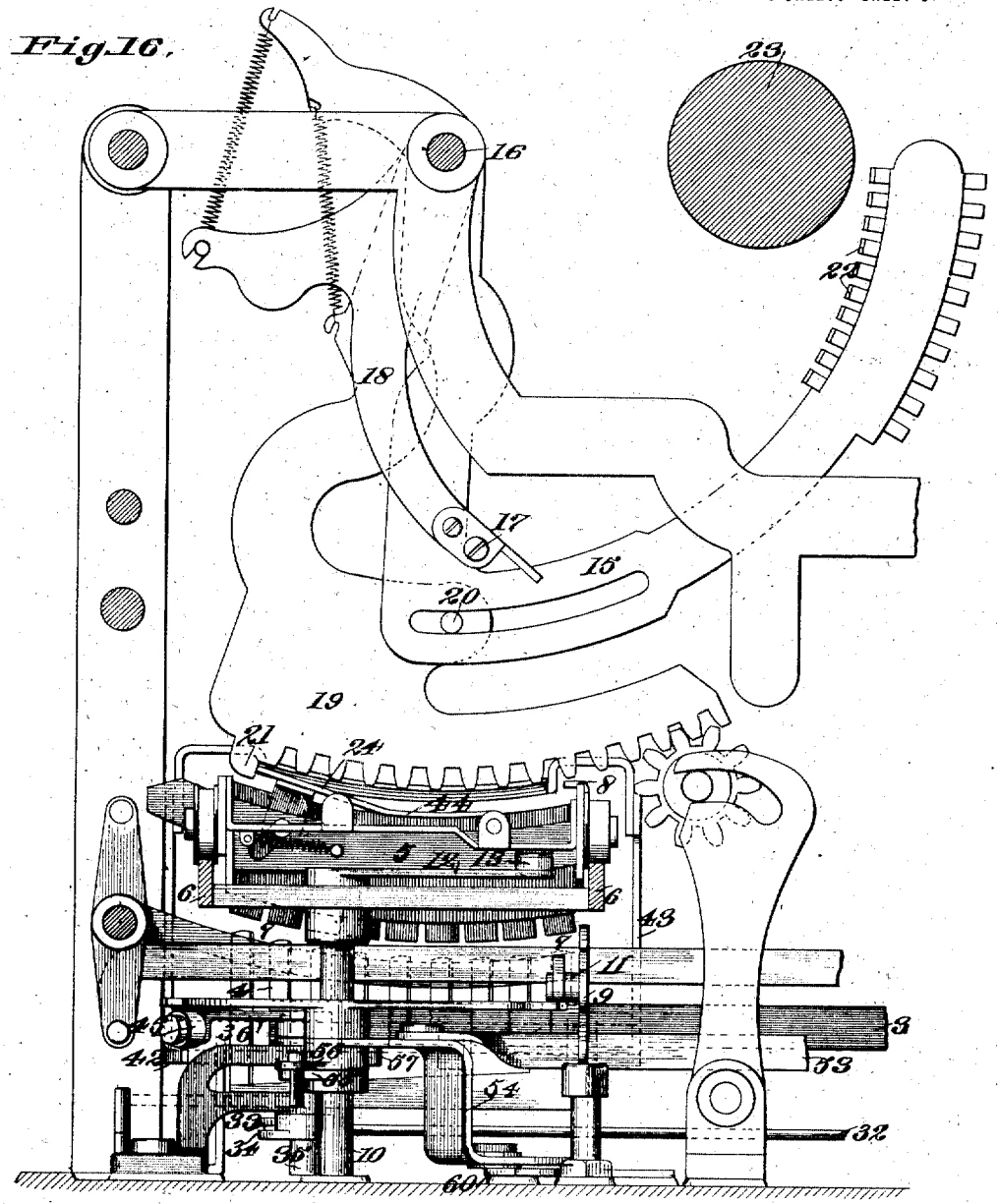

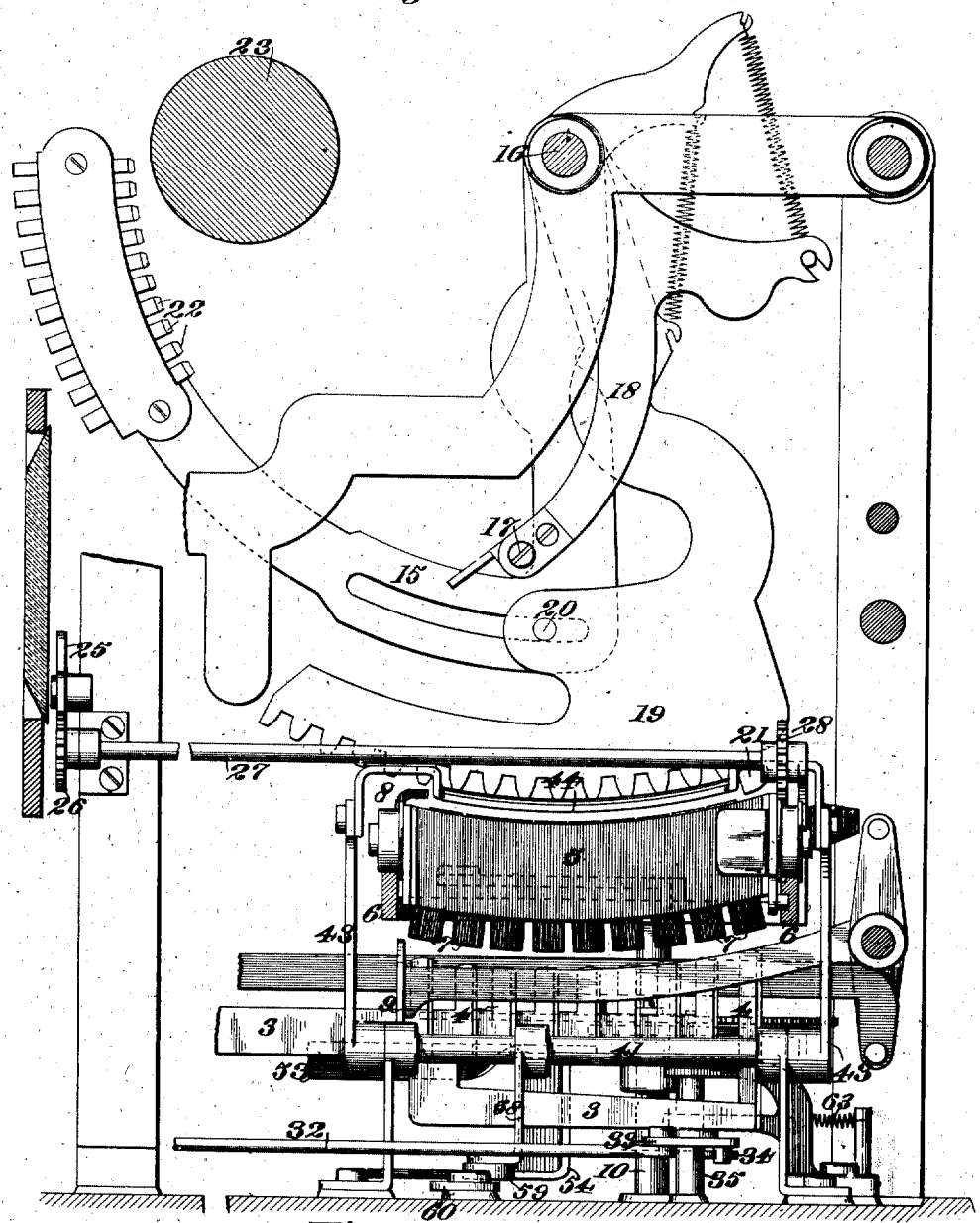

UNITED STATES PATENT OFFICE.

HARRY LANDSIEDEL, OF POPLAR BLUFF, MISSOURI, ASSIGNOR, BY MESNE ASSIGN-
MENTS, TO THE DALTON ADDING MACHINE COMPANY, OF CINCINNATI, OHIO, A
CORPORATION OF OHIO.

ADDING AND RECORDING MACHINE.

1,249,279.      Specification of Letters Patent.      Patented Dec. 4, 1917.

Application filed July 12, 1909. Serial No. 507,275.

*To all whom it may concern:*

Be it known that I, HARRY LANDSIEDEL, a citizen of the United States, residing at Poplar Bluff, Missouri, have invented a new and useful Adding and Recording Machine, of which the following is a specification.

This invention relates to adding and recording machines of the cross carriage type, and its object is to provide mechanism coöperating with a movable carriage to dissipate therefrom one or more digits of any number set up in the carriage.

Another object is to provide an indicator coöperating with the carriage to show the number of orders or digits contained in any number set up in the carriage.

In the accompanying drawings Figure 1 is a front elevation of a cross carriage machine containing my present invention. Figs. 2 and 3 are views of the indicator whereby the number of digits contained in the numbers set up in the carriage are designated. Fig. 4 illustrates a number of four digits such as indicated by the indicators when in the position shown in Fig. 2. Fig. 5 illustrates a number containing seven digits as would be indicated by the indicator in the position shown in Fig. 3. Fig. 6 is a side elevation of the machine with a portion of the case removed to show the connections from the correction keys. Fig. 7 is a detail view of the indicator device detached from its support. Fig. 8 is a detail view of the two correction keys. Fig. 9 is a plan view of the carriage and part of the subject-matter of the present invention in connection therewith. Fig. 10 is a detail view of the carriage-return connections comprising part of the subject-matter of the present invention. Fig. 11 is a perspective view of two levers constituting part of the carriage return and individual digit eliminating mechanism. Fig. 12 is a rear elevation of the movable carriage and the coöperating mechanism. Fig. 13 is a perspective view of the lever whereby the device for restoring the pins in the carriage is operated when one of the correction keys is used. Figs. 14 and 15 are detail views of the locking device whereby the plate for restoring the pins in the carriage is held in its different adjustments. Fig. 16 is a sectional view of the rear of the machine illustrating the coöperative relation of the correction keys and the carriage-controlling devices. Fig. 17 is a detail view showing the key levers in section and their relation to the escapement bar which controls the carriage. Fig. 18 is a sectional view at the rear of the machine at the opposite side from that illustrated in Fig. 16. Figs. 19 and 20 are sectional views illustrating the two positions of the returning devices adjacent to the carriage.

The machine in combination with which I have illustrated my invention is now extensively used commercially, and many of the essential features thereof are disclosed in the application for patent filed January 24, 1903, Serial No. 140,390, and British patent No. 854 of 1904. As known commercially and as described in said application, said machine comprises a keyboard composed of ten keys 1, representing the ten digits, said keys operating through a suitable keyboard and provided on their forward ends with operating buttons 2. The levers 3 of said keys extend longitudinally in the machine and converge near the rear end thereof, being of different lengths, and provided with vertical extensions or hammers 4. (Figs. 10 and 16.) A carriage 5 operates transversely above the rear ends of the key levers upon rails 6. Said carriage contains a series of rows of pins 7. There are nine pins in each row ranging from "0" at the rear to "8" at the front, there being no pins for the digit "9" for which a permanent plate 8 is attached to the front side of the carriage. (Figs. 16 and 18.) Numbers are set up in the carriage by striking the keys successively, observing the proper digits so that they will be set up in the carriage in correct order. An escapement bar 9 extends transversely from the key levers 3 and communicates with a vertical shaft 10 through suitable escapement mechanism 11. An arm 12 attached to the upper end of the shaft 10 has one end pivoted to a link 13, said link being also pivoted to the carriage. A spring 14 connected to the carriage actuates the same transversely, being resisted by the escapement mechanism 9.

In idle position of the carriage the row of pins at the left with respect to the operator facing the machine, is immediately above the key terminals 4 so that when the first key is depressed it will set up a stop in the carriage, except in the case of striking the "9" key, and in which instance the escapement bar 9 will be operated to release the escapement 11 and permit the carriage to be drawn one step leftwardly which is sufficient to bring the next row of pins in the carriage above the key-terminals. Successive operations of the keys have like result, the "9" key also operating the escapement bar and permitting the carriage to be moved the same as in the case of the remaining keys.

These machines also contain a series of type-carriers 15 swinging from the shaft 16 and normally held in their rearward positions by a bar 17 extending in front of the type-carriers and supported by arms 18 depending from said shaft 16. Racks 19 coöperate with the type-carriers and are movable therewith having pin-and-slot connection 20 whereby the operation of the type carriers and racks will be properly timed. After the number has been set up in the carriage as described, the type carriers and racks are swung forwardly, such movement continuing until heels 21 on the racks engage the pins which had been set, or with the plate 8 representing the 9's in the number to be recorded. After the type-carriers are stopped the type 22 thereon are positioned adjacent to the recording line at a paper carriage or platen 23, and by means of any suitable well known device may be driven to record the number represented in the carriage. Those type-carriers, and racks whose operation is not necessary to record the numbers, are restrained from operation by a plate 24 in the carriage which is supported in front of the heels 21 on such of the type-carriers as are not in operation (Figs. 9, 16 and 18). In idle position of the carriage the plate 24 is in front of the heels on all of the racks, so that if the bar 17 be moved to release the type-carriers when no number is in the carriage, the racks and type-carriers will be prevented from operation by the plate 24. As a number is set up in the carriage, the plate 24 is stepped transversely, moving away from one rack for each key operated. After the number has been recorded the carriage may be returned to its idle position through any of the well known devices operable for such purposes.

These machines as at present in use and as described in the application aforesaid, also contain an adding mechanism 19ª operable automatically in connection with the racks upon the return movement of the latter after each number has been recorded, effectively to add the numbers so recorded. The operation of this adding mechanism is well understood and details thereof are not necessary for a clear understanding of the subject-matter of the present invention, for which reason they are not shown in the drawings nor particularly described. It is sufficient for present purposes to understand that each number recorded is automatically introduced into the adding register after the record thereof has been made.

For indicating the number of digits or orders in each number set up in the carriage, I provide an indicating plate 25 supported to slide adjacent to the front of the case (Figs. 6 and 7). Said plate is in the form of a rack and meshes with a pinion 26 attached to the front end of the shaft 27, journaled in suitable bearings one of which is supported by the rear carriage rail 6. A pinion 28 at the rear end of the shaft 27 meshes with a rack 29 on the carriage, whereby when said carriage is stepped across the machine as numbers are set up, the indicator plate 25 will be moved. Said indicator plate operates behind an opaque part of the front of the case, and as the carriage moves said plate is moved across the opening or transparent portion as shown in Figs. 2 and 3. The front side of said plate which thus becomes visible through the open or transparent space contains a series of spaces readily distinguishable from each other and clearly demarked. The first movement of the carriage will cause said plate 25 to be moved a distance sufficient to bring one of said spaces thereon into view, showing that one digit has been set up or registered in the carriage; the next movement of the carriage will move another one of said spaces into view, and so on for each step of the carriage. In this way the operator will be informed of the number of spaces which the carriage has been moved, and whether or not any number is represented in the carriage. Return movement of the carriage slides the plate 25 to its idle position in which it is shielded behind the opaque portion of the front of the case, indicating that no number is contained in the register carriage.

I also have provided mechanism for dissipating from the carriage any digit set up therein through error or otherwise when so desired. Said mechanism includes a key 30 operatively mounted in the keyboard and having the lower end of its stem pivoted to one arm of the bell crank lever 31. (Figs. 1, 6 and 7). The opposite arm of said lever is connected to a link 32 leading to the lever 33 pivoted to the base of the machine below the carriage. The lever 33 has pin-and-slot connection with the lever 34 attached to the lower end of the shaft 35. The upper end of the shaft 35 supports an arm 36 having rigid connection therewith. A pawl 37 is pivoted to the arm 36 and is held in its idle position against an abutment 38 by a spring 39, the opposite end of said spring 39 being connected to a projection 40. When the key 30 is depressed it will rock the shaft 35 and move the pawl 37 into engagement with the teeth of the escapement segment attached to the shaft 10, and thereby operate the shaft 10 effectively to move the carriage one space toward its initial position. When the carriage has moved one step or space, further movement thereof will be stopped by engagement of the pin 40 with the teeth of the escapement segment.

A rod or shaft 41 is supported below the rails 6 and at its rear end has a bell crank lever 42 attached thereto, one arm of said lever extending horizontally and the other arm extending vertically. To the opposite end of said shaft 41 a vertical arm 43 is attached, and said arm, in connection with the vertical arm of the lever 42, supports a plate 44 above the pin carriage. The arm 36 above referred to carries a roller 45 (Figs. 10 and 12). When the shaft 35 is rocked by operation of the key 30 the roller 45 is moved onto the horizontal arm of the lever 42, thereby lowering the edge of the plate 44 to strike the last pin which had been set up in the carriage and restore said pin to idle position. The inner edge of the plate 44 is extended obliquely upwardly as shown in Figs. 19 and 20 and when the carriage is moved to idle position after recording any number, all of the up-raised pins in the carriage will be thrown against the oblique edge of the plate and thereby pressed downwardly to their idle or normal positions. Also by operating the plate through manipulation of the key 30, the digits of any number set up in the carriage may be successively eliminated or dissipated therefrom, the pins being restored to idle position as the carriage is stepped backwardly toward its starting point. As the digits are thus dissipated from the carriage, the plate 25 will be moved to indicate that fact so that the operator will be informed at all times as to the exact position of the carriage.

The carriage may also be moved the entire distance to restore all of the pins therein without recording or adding the number set up in the carriage. A key 46 is operatively mounted in the keyboard and having its lower end connected with a pivoted arm 47 (Figs. 6 and 8). One end of said arm 47 is pivoted to a link 48 having pin-and-slot connections 49 with the arm 50 attached to the rock shaft 51. The opposite end of the rock shaft 51 has an arm 52 attached thereto, and a link 53 leads from said arm 52 to an arm 54 loosely mounted on the escapement shaft 10 (Figs. 10 and 16). The shaft 51 and the connections therefrom to the escapement shaft constitute part of the usual carriage return mechanism whereby the carriage is automatically returned to idle position after each number has been recorded. The pin-and-slot connection 49 permits operation of the devices connected to the shaft 51 without disturbing the key 46, so that the key may be operated effectively to restore the carriage to idle position without recording the number, and when any number is recorded the carriage will be restored to its initial position without disturbing the key. The connection between the arm 54 and the escapement shaft 10 includes an arm 55 rigid on the shaft, and a pin 56 on said arm adapted to be engaged by a pin 57 on the arm 54 when the latter is swung rearwardly. This movement of the arm 54 will rotate the shaft 10 effectively to move the carriage to idle position.

The plate 44 is also depressed whenever the carriage is restored to idle position whether by operation of the key 46 or by operation resulting from recording a number. The shaft 41 supports an arm 58 (Figs. 10 and 13) having on its lower end a roller 59 against which the rounded end of the arm 54 operates when said arm is moved rearwardly whether by operation of the key 46 or by the recording mechanism. This movement rocks the shaft 41 effectively to move the plate 44 to its lower position as indicated in Fig. 20, in which all of the pins passing thereunder will be depressed to their lower positions in the carriage. When the arm 54 swings rearwardly beyond the roller 59, the arm 58 will be locked or latched to hold the plate 44 in its depressed position by means of a latch plate 60 pivoted to the base of the machine and having a notch 61 within which the lower extension of the arm 58 will be engaged when moved by the arm 54. The spring 62 (Fig. 10) acts to engage the latch device with the arm as stated. The spring 63 restores the arm 54 and the parts connected therewith to their idle positions after operation whether by the recording mechanism or by the key 46. A projection 64 on the arm 54 is arranged to engage with the latch device 60 and hold said latch device disengaged from the arm 58 in the idle position of the parts, and thereby permit the plate 44 to be moved to its lifted position in which it is normally sustained by means of the spring 65 (Fig. 12).

To avoid confusion and mistakes, it is desirable that both the keys 30 and 46 be prevented from operation after the recording mechanism has been put in operation. For such purpose pawls 66 are pivoted adjacent to said keys, being normally held out of engagement therewith by links 67. When the recording mechanism starts to operate the links 67 permit the pawls 66 to engage with teeth on the keys 30 and 46, and thereby to lock them against operation.

I am aware that there may be modifications and alterations in the construction and arrangement of the parts embodying this invention without departure from the spirit and scope of the invention, and I do not restrict myself to identical features of construction or arrangement, but what I claim and desire to secure by Letters Patent is—

1. In a machine of the character described, the combination of a movable carriage, a rack attached to said carriage, a shaft supported independently of said carriage, a pinion on said shaft meshing with said rack, whereby said shaft is rotated when said carriage moves from one position to another, a slide movable to and from visible positions, for indicating the position of said carriage, a rack on said slide, and a pinion on said shaft meshing with said rack, whereby said slide is actuated.

2. In a machine of the character described, the combination of a movable carriage, mechanism for moving said carriage to different selected positions, a rack mounted on said carriage, a shaft supported independently of said carriage, a pinion on said shaft meshing with said rack, whereby said shaft is rotated by the movement of said rack, a plate, supports on which said plate is movable to and from visible positions, a rack in connection with the plate, and a pinion on said shaft meshing with said last-named rack and acting to move said plate in conformity with the movement of said carriage to indicate the position thereof.

3. In a machine of the character described, rails, a movable carriage supported on said rails, mechanism for moving said carriage to different selected positions on said rails, bearings supported independently of said carriage, a shaft journaled in said bearings, a pinion on said shaft, a rack on said carriage meshing with said pinion, whereby said shaft is rotated by the movement of said carriage, a plate, supports on which said plate is movable to and from visible positions, a series of spaces on said plate corresponding to the positions to which said carriage is movable as aforesaid, a rack in connection with said plate, and a pinion on said shaft meshing with said rack, whereby said plate is moved in conformity with the movements of said carriage.

4. In a machine of the character described, a movable carriage, mechanism for moving said carriage to different selected positions, a rack on said carriage, a shaft supported transversely of and above said carriage, a pinion on said shaft driven by said rack, whereby said shaft is rotated by the movement of said carriage, a plate supported transversely of said shaft, demarked divisions on said plate corresponding to the different positions of said carriage, a shield covering said plate when said carriage and plate are in their idle positions and having an open space for disclosing said divisions when said plate is out of its idle position, a rack on said plate, and a pinion on said shaft meshing with said rack, whereby said plate is moved in conformity with the movements of said carriage to position said division on the plate at the open space in said shield and thereby indicate the different positions of said carriage.

5. In a machine of the character described, the combination of a movable carriage, mechanism for moving said carriage, a rack supported on said carriage parallel with the line of movement thereof, a pinion meshing with said rack, a shaft supported transversely of said carriage and arranged to be rotated by said pinion, and an indicating device operable by said shaft transversely of the axis thereof to indicate the position of said carriage at any time.

6. In a machine of the character described, a carriage movable to different selected positions, an indicating device movable to different positions for indicating the positions of said carriage, a rack in connection with said indicating device, a pinion meshing with said rack, a shaft for rotating said pinion to move said indicating device, bearings supporting said shaft transversely of and above said carriage, and means actuated by the carriage for rotating said shaft and thereby moving said indicating device to indicate the position of said carriage.

7. In a machine of the character described, a movable carriage, means for moving said carriage in one direction to different selected positions, and in the opposite direction to different selected positions toward its starting point, a shaft rotated by the movement of said carriage in either direction, an indicating device for indicating any of the positions to which said carriage is moved, means for supporting said indicating device independently of said shaft, and means driven by said shaft for moving said indicating device to indicate the positions of said carriage.

8. In a machine of the character described, a movable carriage, mechanism for moving said carriage step by step in one direction to different selected positions, means for moving said carriage step by step in the opposite direction to different selected positions toward its starting point, a revoluble shaft actuated by the movement of said carriage in either direction, an indicating device supported independently of said shaft, a rack in connection with the indicating device, a pinion on said shaft meshing with said rack, whereby said indicating device will be moved as an incident to the movement of said carriage to indicate the position of the latter, and a shield covering said indicating device when said carriage is in its normal position.

9. In a machine of the character described, a movable carriage, an actuator for moving said carriage to different selected positions in one direction from its starting point, means controlling the movement of the carriage by said actuator, mechanism for moving said carriage in the opposite direction to its starting point, a rack supported by said carriage, a pinion meshing with said rack, a shaft controlled by said pinion, an indicating device operable by said shaft to indicate the position of said carriage, and supports on which said indicating device is mounted for movement by said shaft.

10. In a machine of the character described, a movable carriage, means for moving said carriage in one direction to different selected positions, a device for indicating the position of said carriage, supports on which said device is mounted for movement to and from visible positions, a rack in connection with said device, a pinion meshing with said rack, a shaft for rotating said pinion to move said device to different positions to indicate the position of said carriage, bearings supporting said shaft horizontally and transversely of the line of movement of said carriage, a rack on said carriage parallel with the line of movement thereof, and another pinion on said shaft in mesh with the rack on the carriage.

11. In a machine of the character described, the combination of a movable carriage, a rack attached to said carriage, a shaft supported at right angles to the line of movement of said carriage, a pinion on said shaft meshing with said rack whereby said shaft is rotated when said carriage moves, a slide, a rack on said slide, and a pinion on said shaft meshing with said rack for moving said slide into and out of vision of the operator.

12. In a machine of the character described, the combination with a removable carriage, and mechanism for moving said carriage, of a rack mounted on said carriage, a shaft journaled at right angles to the line of movement of said carriage, a pinion on said shaft meshing with said rack whereby said shaft is rotated by the movement of said rack, a plate movable transversely of the line of vision of the operator, a rack in connection with said plate, and a pinion on said shaft meshing with said last-named rack and acting to move said rack, and thereby moving said plate transversely of the line of vision of the operator to indicate the positions of said carriage.

13. In a machine of the character described, rails, a carriage movably supported on said rails, mechanism for moving said carriage to different stepped positions on said rails, bearings, a shaft journaled in said bearings at right angles to the line of movement of said carriage, a pinion on said shaft, a rack on said carriage meshing with said pinion whereby said shaft is rotated by the movement of said carriage, a sliding plate, a series of spaces on said plate corresponding to the stepped positions of said carriage, a rack on said plate, and a pinion on said shaft meshing with said rack whereby said plate is moved into and out of view of the operator in accordance with the movements of said carriage.

14. In a machine of the character described, a movable carriage, mechanism for moving said carriage to different stepped positions, a rack on said carriage, a shaft, a pinion on said shaft meshing with said rack whereby said shaft is rotated by the movement of said carriage, a plate, divisions on said plate corresponding to the different stepped positions of said carriage, a shield covering said plate and having an open space for disclosing said divisions when said plate is moved, a rack on said plate, and a pinion on said shaft meshing with said rack whereby said plate is moved in accordance with the movements of said carriage to indicate the different stepped positions of said carriage.

15. In a machine of the character described, the combination with a carriage, and means for moving said carriage, of a rack supported on said carriage, a pinion meshing with said rack, a shaft arranged to be rotated by said pinion, and an indicating device operable by said shaft to indicate the position of said carriage.

16. In a machine of the character described, the combination with a carriage, and means for moving said carriage, of an indicating device, a rack in connection with said indicating device, a pinion meshing with said rack, a shaft for rotating said pinion to move said indicating device, and means actuated by the carriage for rotating said shaft.

17. In a machine of the character described, the combination with a carriage, means for reciprocating said carriage, a shaft rotated by the movement of said carriage, an indicating device, means for supporting said indicating device independently of said shaft, and means driven by said shaft for moving said indicating device to indicate the position of said carriage.

In testimony whereof, I hereunto affix my signature to this specification this 8th day of July, 1909, in the presence of two witnesses.

HARRY LANDSIEDEL. [L. s.]

Witnesses:
CHARLES PICKLES,
SEELY C. BURNS.